(12) United States Patent
Lee et al.

(10) Patent No.: US 8,733,796 B2
(45) Date of Patent: May 27, 2014

(54) ROBOT CLEANER

(75) Inventors: Jeihun Lee, Seoul (KR); Jeongsuk Yoon, Seoul (KR); Jongwon Park, Daejeon (KR); Yunkeun Kwak, Daejeon (KR); Jichul Kim, Daejeon (KR); Donghoon Yi, Seoul (KR); Seungmin Baek, Seoul (KR)

(73) Assignee: LG Electronics Inc., Seoul (KR)

( * ) Notice: Subject to any disclaimer, the term of this patent is extended or adjusted under 35 U.S.C. 154(b) by 87 days.

(21) Appl. No.: 13/076,909

(22) Filed: Mar. 31, 2011

(65) Prior Publication Data

US 2011/0239382 A1    Oct. 6, 2011

(30) Foreign Application Priority Data

Apr. 1, 2010 (KR) ........................ 10-2010-0030117

(51) Int. Cl.
*B60S 1/68* (2006.01)
(52) U.S. Cl.
USPC .................................. 280/855; 280/856; 15/3
(58) Field of Classification Search
CPC ........................................................ B60S 1/68
USPC ........ 280/855, 856; 15/3, 40, 41.1, 48, 256.5, 15/256.51, 319, 340.1, 340.3, 340.4, 363; 301/36.3
See application file for complete search history.

(56) References Cited

U.S. PATENT DOCUMENTS

| | | | |
|---|---|---|---|
| 1,616,268 A * | 2/1927 | La Pierre ........................ 280/855 |
| 1,752,993 A * | 4/1930 | Livesay .......................... 280/855 |
| 1,771,642 A * | 7/1930 | Larson et al. .................. 280/855 |
| 1,882,244 A * | 10/1932 | De Nooy ........................ 280/855 |
| 1,933,679 A * | 11/1933 | Nicewander et al. ......... 280/855 |
| 2,052,097 A * | 8/1936 | Ledbetter ........................ 301/50 |
| 2,151,256 A * | 3/1939 | Wolf ............................. 280/855 |
| 2,484,948 A * | 10/1949 | Lafrate .......................... 280/855 |
| 2,585,914 A * | 2/1952 | Carlton .......................... 280/855 |
| 2,937,883 A * | 5/1960 | Alcoriza ........................ 280/855 |
| 3,744,080 A * | 7/1973 | Smith, Jr. ................... 15/256.51 |
| 3,913,943 A * | 10/1975 | Tamburino et al. ........... 280/856 |
| 4,613,145 A * | 9/1986 | Greff, Sr. ....................... 280/855 |
| 6,633,150 B1 * | 10/2003 | Wallach et al. .......... 318/568.12 |
| 6,883,201 B2 * | 4/2005 | Jones et al. ..................... 15/319 |
| 7,131,670 B2 * | 11/2006 | Kinoshita ..................... 280/856 |
| 7,143,472 B2 * | 12/2006 | Hicks ........................ 16/18 CG |

(Continued)

FOREIGN PATENT DOCUMENTS

JP   53-025065 A   3/1978
JP   05-051230 U   7/1993

(Continued)

OTHER PUBLICATIONS

European Search Report dated Aug. 2, 2011 issued in Application No. 11 00 2706.
Japanese Office Action dated May 30, 2012 issued in Application No. 2011-079357.

*Primary Examiner* — J. Allen Shriver II
*Assistant Examiner* — Steve Clemmons
(74) *Attorney, Agent, or Firm* — Ked & Associates, LLP

(57) ABSTRACT

A robot cleaner includes wheels mounted at a lower side of a main body of the robot cleaner to allow for traveling of the main body, and wire winding prevention members mounted at the lower side of the main body, each wire winding prevention member having one end extending to be contactable with a rim of the corresponding wheel. The wire winding prevention member is preferably a torsion spring.

11 Claims, 3 Drawing Sheets

(56) References Cited

U.S. PATENT DOCUMENTS

| | | | |
|---|---|---|---|
| 7,278,910 B1 * | 10/2007 | Jernigan | 451/350 |
| 2006/0190146 A1 | 8/2006 | Morse et al. | 701/23 |
| 2007/0061040 A1 | 3/2007 | Augenbraun et al. | 700/245 |
| 2010/0037418 A1 * | 2/2010 | Hussey et al. | 15/319 |

FOREIGN PATENT DOCUMENTS

| | | |
|---|---|---|
| JP | 06-046652 U | 6/1994 |
| JP | 06-217906 A | 8/1994 |
| JP | 2001-008864 A | 1/2001 |
| JP | 2005-218560 A | 8/2005 |

* cited by examiner

ROBOT CLEANER

CROSS-REFERENCE TO RELATED APPLICATION

Pursuant to 35 U.S.C. §119(a), this application claims the benefit of earlier filing date and right of priority to Korean Application No. 10-2010-0030117, filed on Apr. 1, 2010, the contents of which is incorporated by reference herein in its entirety.

BACKGROUND OF THE INVENTION

1. Field of the Invention

This specification relates to a robot cleaner, and particularly, to a robot cleaner having a member for obviating a wire from being wound (rolled, entangled) around a wheel.

2. Background of the Invention

A cleaner is an apparatus for cleaning a room or the like by removing foreign materials therefrom. Generally, a vacuum cleaner, which sucks up foreign materials using a suction force of a pressure section, is generally used. In recent time, a robot cleaner, which moves by itself by virtue of an automatic travel function to remove foreign materials from a floor of a room without a user's work, has been developed.

The robot cleaner includes a distance sensor for detecting a distance up to an obstacle, such as furniture, office supplies, walls and the like, present in a zone to be cleaned, and left and right wheels for traveling of the robot cleaner. Here, the left and right wheels are configured to be rolled by a left-wheel motor and a right-wheel motor, respectively. Accordingly, the robot cleaner converts traveling directions by itself in response to the operation of the left-wheel motor and the right-wheel motor to perform cleaning of a room. A suction element is provided within a main body of the robot cleaner, and a suction opening for sucking dust up therethrough is present at a lower surface thereof. Furthermore, an agitator for sweeping up dust on a floor of the cleaning zone is rotatably mounted at the inlet. A filter for filtering foreign materials in the air sucked from the floor to purify the air is provided in an air flow path within the robot cleaner. Hence, the robot cleaner sucks dust up on the floor into the main body by a suction force of the suction element and the rotation of the agitator with traveling in the cleaning zone, and collects the dust at the filter, thus to perform automatic cleaning. The collected dust is stored in a dust can within the robot cleaner.

FIG. 1 is a side sectional view showing a schematic structure of a robot is cleaner according to the related art, and FIG. 2 is a view showing a lower side of the robot cleaner. Briefly explaining the structure, the robot cleaner includes a battery 10 rechargeably disposed therein and having a rectangular parallelepiped shape so as to supply power for working the robot cleaner, and a dust can 20 for storing collected dust and a suction fan 30 for providing a driving force to suck up dust. An agitator 40 and a brush 50 are provided at a lower side of a main body of the robot cleaner to gather up dust from a floor of the lower side of the robot cleaner. Wheels 80 are provided at the lower side of the robot cleaner. The wheels 80 are rolled by power charged in the battery 10 to move the main body of the robot cleaner.

However, to clean the floor of the room, the robot cleaner travels with the wheels 80 being rolled. During traveling in the room, the wire or other line dragged on the floor may be entangled in the wheel to be wound into the main body of the robot cleaner. Such entangled wire may be finally wound around a driving shaft of the wheel to make the wheel difficult to be rolled. That is, the wire or other slender line entangled in the wheel 80 may be wound (rolled, entangled) into a gap G between the wheel 80 and a lower surface of the main body shown in FIG. 2.

SUMMARY OF THE INVENTION

Therefore, to solve the problem, an aspect of the detailed description is to obviate a situation that a wire or the like dragged on a floor of a room is rolled into a main body of a robot cleaner with being entangled in a rotating wheel of the robot cleaner.

To achieve these and other advantages and in accordance with the is purpose of this specification, as embodied and broadly described herein, a robot cleaner may include wheels mounted at a lower side of a main body of the robot cleaner to allow for traveling of the main body, and wire winding prevention members mounted at the lower side of the main body, each wire winding prevention member having one end extending to be contactable with a rim of the corresponding wheel.

Here, the rim of the wheel may include a guide slit configured to accommodate the one end of the wire winding prevention member. The guide slit may be formed in a circumferential direction of the rim, and the one end of the wire winding prevention member may be disposed perpendicular to a rotation shaft of the wheel.

The one end of the wire winding prevention member may have elasticity toward the center of the rotation shaft of the wheel in a contact state with the rim of the wheel. The wire winding prevention member may be a torsion spring.

The wire winding prevention member may extend in a direction that the main body moves forward to be contactable with the rim of the wheel.

The configuration can prevent a wire or the like from being wound into the main body of the robot cleaner due to being entangled into a rotating wheel of the robot cleaner.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings.

For the sake of brief description with reference to the drawings, the same or equivalent components will be provided with the same reference numbers, and description thereof will not be repeated.

Figure 1:
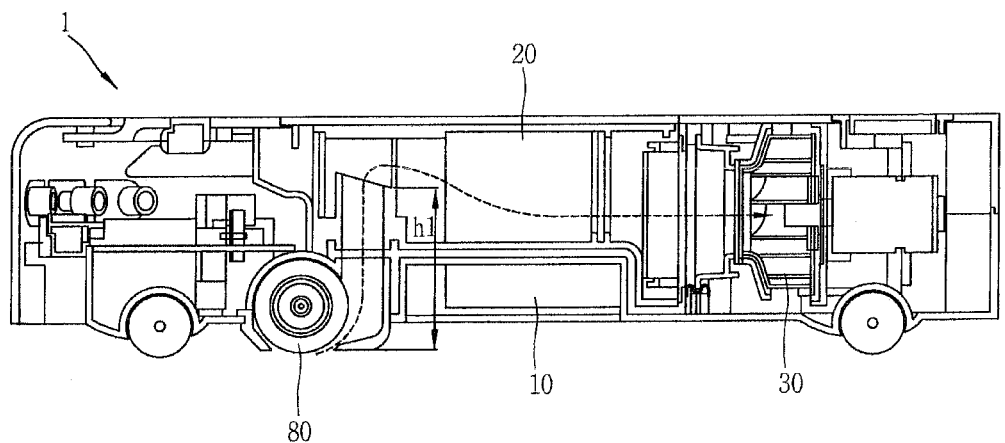
FIG. 1 is a side sectional view showing a schematic structure of a robot cleaner according to the related art.
Figure 2:
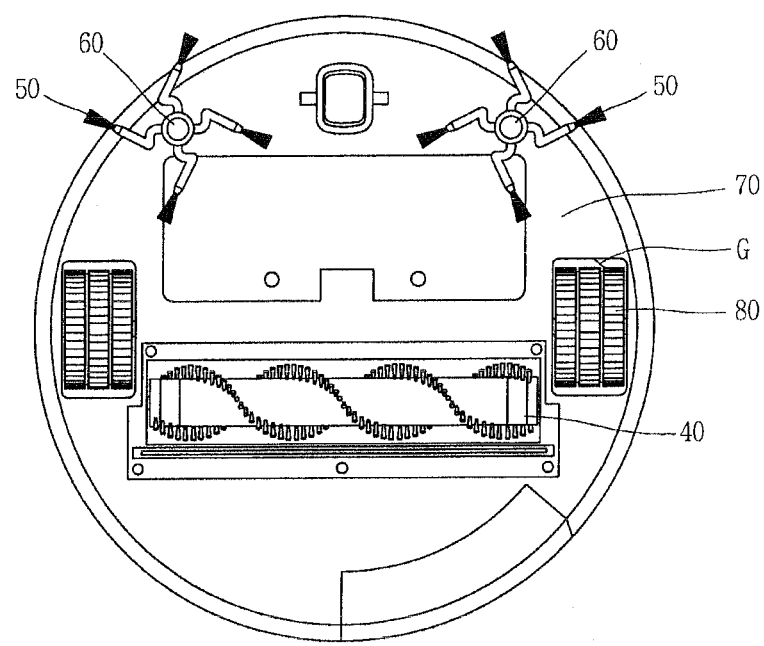
FIG. 2 is a view showing a lower side of the robot cleaner shown in FIG. 1.
Figure 3:
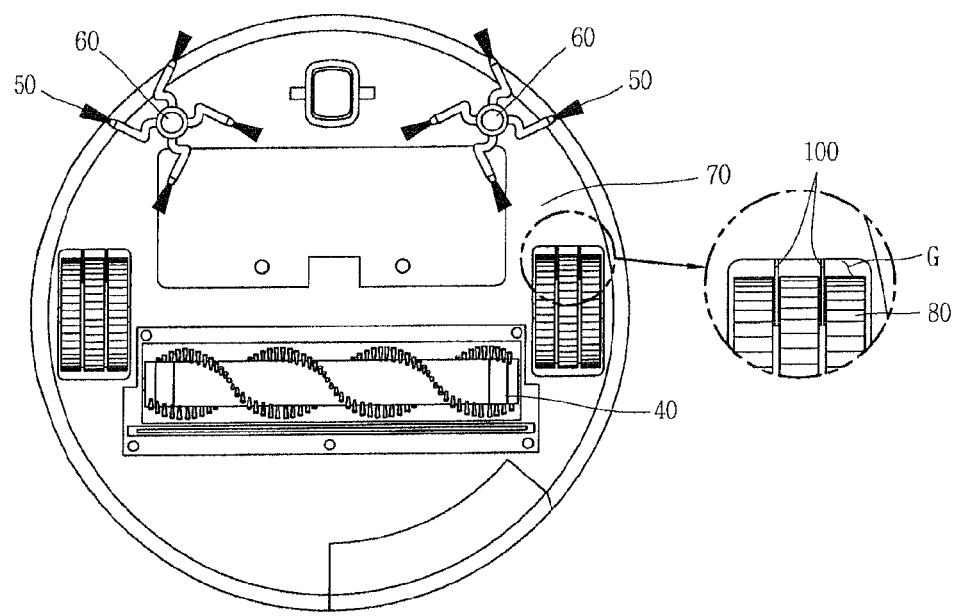
FIG. 3 is a view showing a lower side of a robot cleaner in accordance with one exemplary embodiment.
Figure 4:
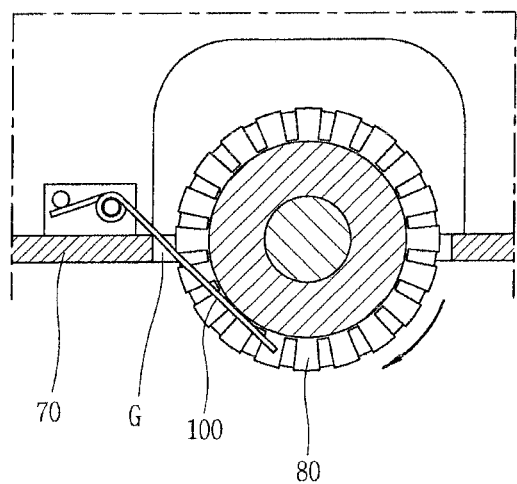
FIG. 4 is a partial view of the robot cleaner shown in FIG. 3 viewed from a side surface thereof.
Figure 5:
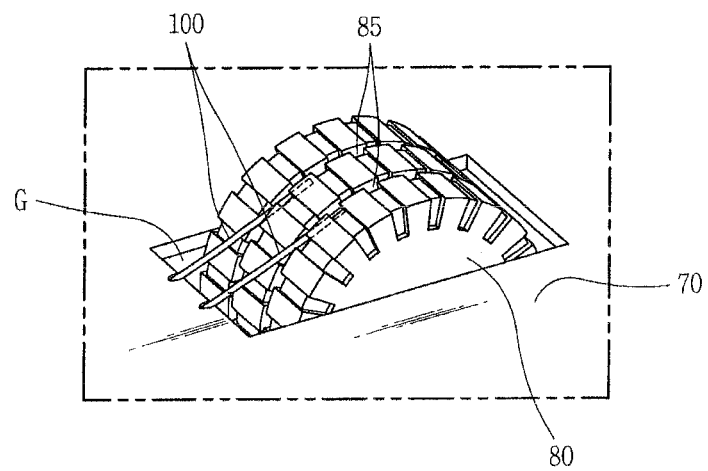
FIG. 5 is a detailed perspective view showing a partial wheel of the robot cleaner shown in FIG. 3.

FIG. 3 is a view showing a lower side of a robot cleaner in accordance with one exemplary embodiment, FIG. 4 is a partial view showing the robot cleaner viewed from a side surface thereof, and FIG. 5 is a detailed perspective view showing a partial wheel of the robot cleaner. As shown in FIGS. 3 to 5, the robot cleaner may include a battery rechargeably disposed in the robot cleaner for supplying power to work the robot cleaner, a dust can for storing collected dust, a suction fan for providing a driving force to suck up dust, and the like. Such configuration is the same as that of the related art robot cleaner, so detailed description thereof will be omitted. Also, the robot cleaner may further include an agitator 40 and a brush 50 disposed at a lower side of the main body to gather up dust from the floor of the lower side of the robot cleaner and suck up the gathered dust via an inlet located near the agitator 40, thereby performing a cleaning operation. The wheels 80 disposed at the lower side may be rolled by power supplied from the battery, thereby allowing the robot cleaner main body to travel on the floor.

In this specification, when the robot cleaner travels in response to rotation of the wheels 80 to clean the floor of a room, in order to obviate a wire, a line or the like dragged on the floor from being entangled into the wheel 80 and rolled (wound) into the main body of the robot cleaner, a wire winding prevention member 100 may be mounted at the lower side of the main body of the robot cleaner. The wire winding prevention member 100 may have one end extending through a gap G between a lower surface 70 and the wheel 80 to be contactable with a rim of the wheel 80, and another end thereof may be coupled to the lower side of the main body of the robot cleaner.

The one end of the wire winding prevention member 100 may preferably be contactable with the rim of the wheel 80 by extending perpendicular to a wheel is rotation shaft. Also, the one end of the wire winding prevention member 100 may preferably extend in a direction that the main body moves forward (i.e., since the wheel 80 is rolled in a clockwise direction in FIG. 4, the forward direction of the main body is right in FIG. 4), to thusly be contactable with the rim of the wheel 80. The rim of the wheel 80 contactable with the one end of the wire winding prevention member 100 may be provided with a guide slit in a circumferential direction thereof. The wire winding prevention member 100 may preferably have elasticity toward the center of the wheel 80 in a contact state with the rim of the wheel 80, such that the one end of the wire winding prevention member 100 can be kept contacting the rim of the wheel 80 even when the wheel 80 is rolled up and down (especially, in an upward direction in FIG. 4).

To this end, the wire winding prevention member 100 may be implemented as a torsion spring. That is, the torsion spring may be mounted at the lower side of the main body of the robot cleaner. Accordingly, one end of the torsion spring may extend to be contactably inserted into the guide slit formed at the rim of the wheel 80, thereby pressing the rim of the wheel 80 with predetermined pressure. Also, the wire winding prevention member 100 may be provided in plurality in consideration of a width of the wheel 80. The drawings exemplarily illustrate two wire winding prevention members.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A robot cleaner comprising:
wheels rotatably mounted at a lower side of a main body of the robot cleaner to allow travel of the main body; and
wire winding prevention members mounted at the lower side of the main body, each wire winding prevention member having an extending portion to contact a rim of a corresponding wheel, wherein a portion of the wheel is disposed within the lower side of the main body and a gap is formed between a lower surface of the main body and the wheel, and wherein the extending portion of the wire winding prevention member extends across the gap, and wherein each rim of the wheel comprises a guide slit configured to accommodate an end of the extending portion of the corresponding wire winding prevention member, the guide slit extends continuously and circumferentially of the rim of wheel, and the extending portion of the wire winding prevention member further extends from a point of contact with the rim of the wheel.

2. The robot cleaner of claim 1, wherein the extending portion of the wire winding prevention member is disposed perpendicularly to a rotation shaft of the wheel.

3. The robot cleaner of claim 2, wherein the extending portion of the wire winding prevention member has elasticity toward a center of a rotation shaft of the wheel in contact with the rim of the wheel.

4. The robot cleaner of claim 1, wherein the wire winding prevention member is a torsion spring.

5. The robot cleaner of claim 1, wherein the extending portion of the wire winding prevention member extends in a forward direction of the main body to contact with the rim of the wheel.

6. A robot cleaner comprising:
a main body having a lower surface, an opening being formed in the lower surface;
a wheel that permits travel of the cleaner, the wheel being rotatably mounted within the main body and extending through the opening, a gap formed between an edge of the opening and a rim of the wheel;
a wire winding prevention member mounted at the lower surface of the main body, the wire winding prevention member extends across the gap and contacts the rim of the wheel, and wherein the rim of the wheel comprises a guide slit accepts an end of the wire winding prevention member, the guide slit extends continuously and circumferentially of the rim of the wheel, and the end of the wire winding prevention further extends from a point of contact with the rim of the wheel.

7. The robot cleaner according to claim 6, wherein the opening comprises a plurality of opening and the wheel comprises a plurality of wheels, each wheel being disposed within a respective opening.

8. The robot cleaner according to claim 7, wherein the wire winding prevention member comprises a plurality of wire winding prevention member and wherein the rim of each wheel comprises a guide slit which accepts an end of one of the wire winding prevention members.

9. The robot cleaner according to claim 8, wherein each wire winding prevention member is biased against the wheel in contact with the guide slit.

10. The robot cleaner according to claim 9, wherein each wire winding prevention member is a torsion spring.

11. The robot cleaner according to claim 10, wherein the torsion spring is pivotably mounted within the main body.

\* \* \* \* \*